Figure 1:
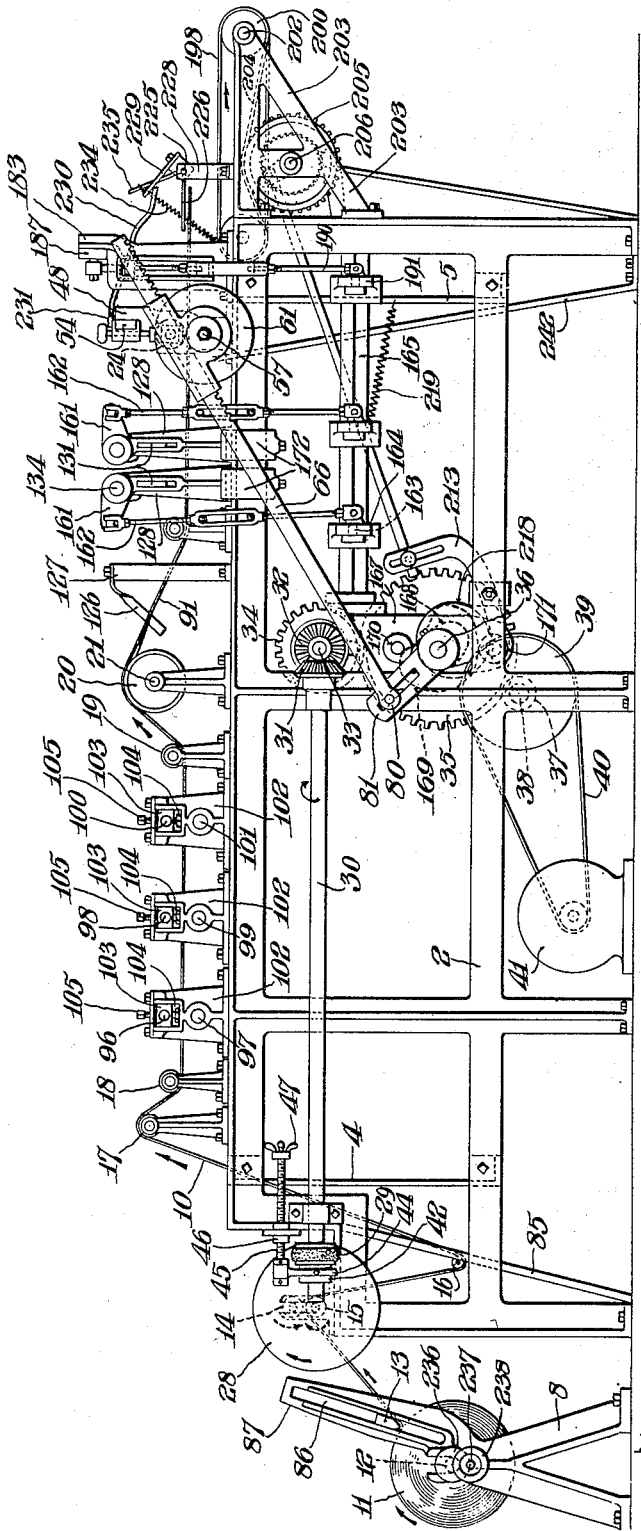

Dec. 16, 1930.  W. FLETT  1,785,546
MACHINE FOR MAKING LOOSE LEAVES FOR BOOKS
Filed Nov. 24, 1928  12 Sheets-Sheet 1

Inventor
William Flett
By
Attorney

Dec. 16, 1930.  W. FLETT  1,785,546
MACHINE FOR MAKING LOOSE LEAVES FOR BOOKS
Filed Nov. 24, 1928  12 Sheets-Sheet 2
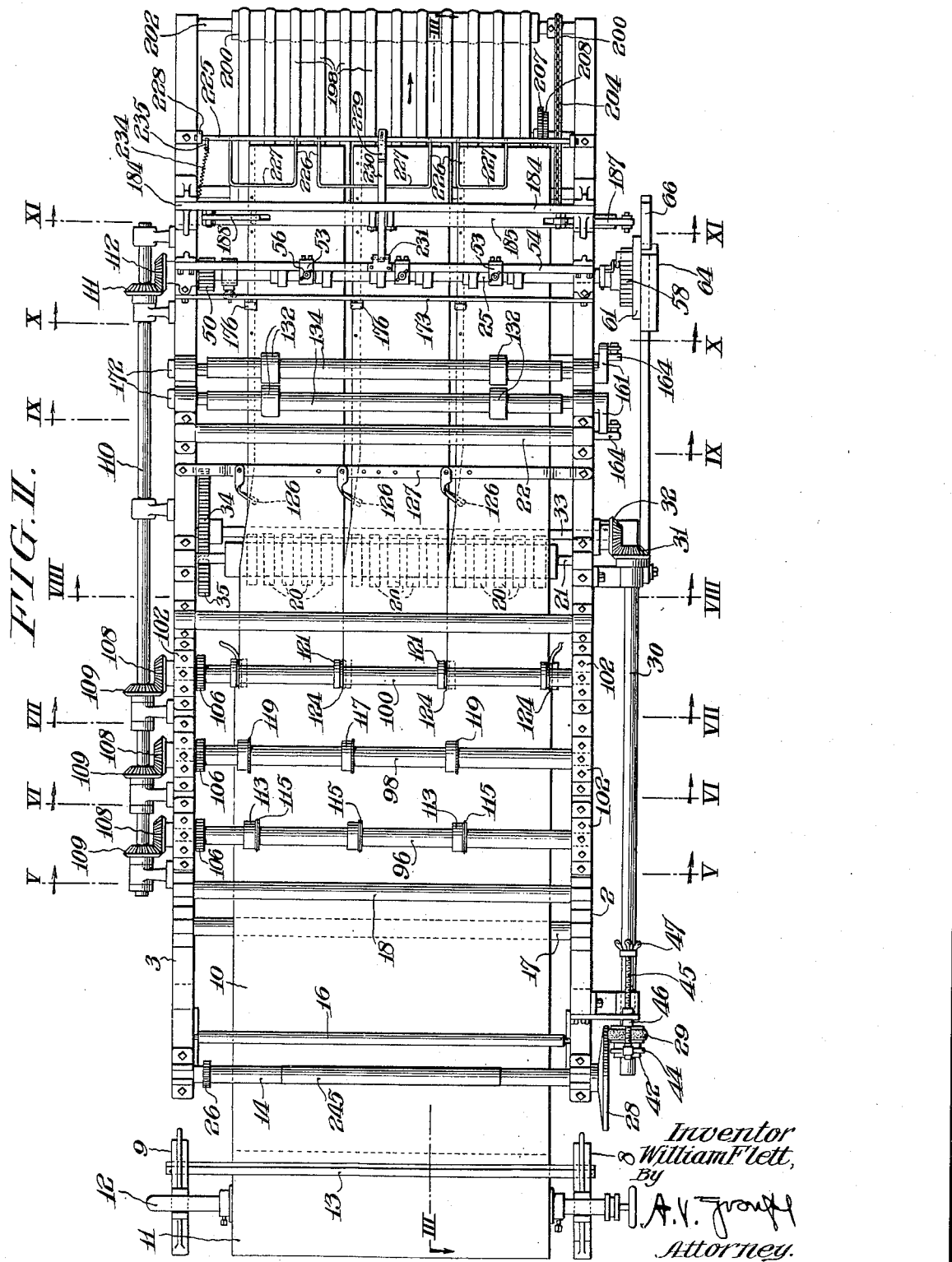

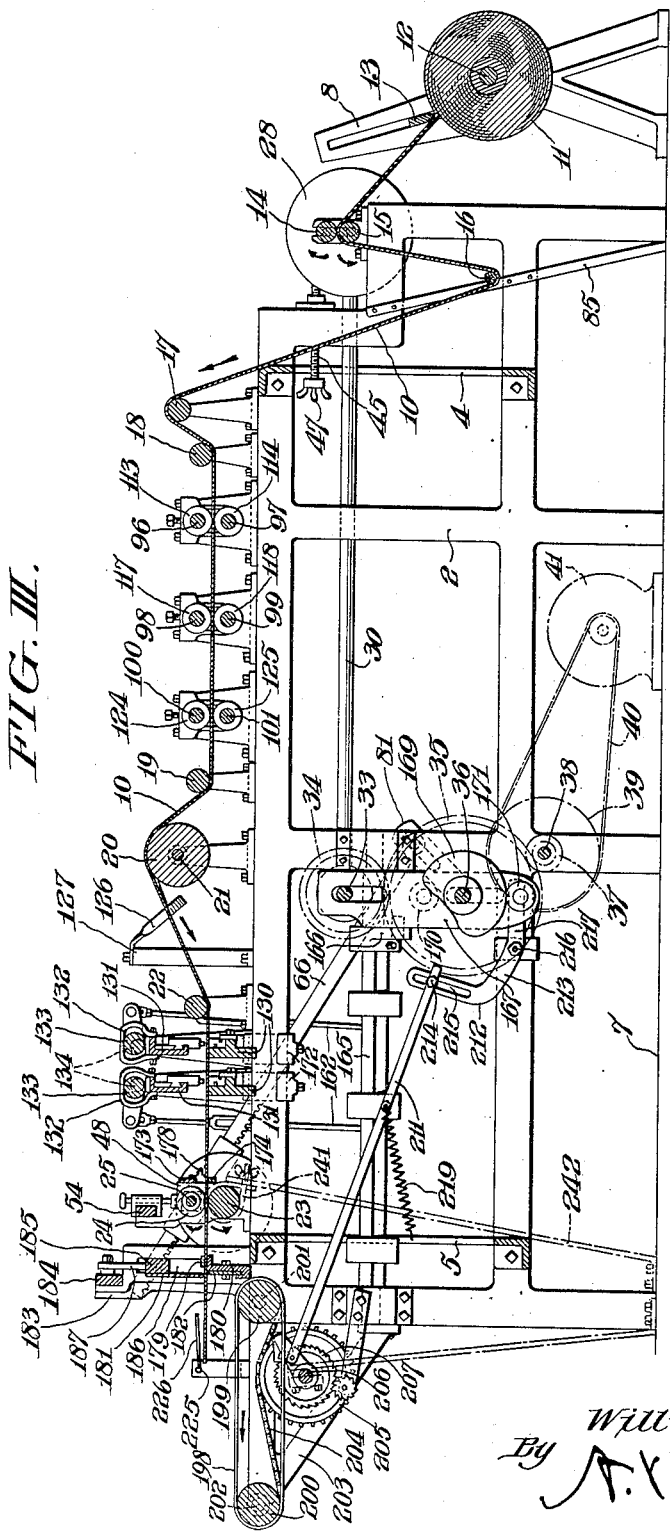

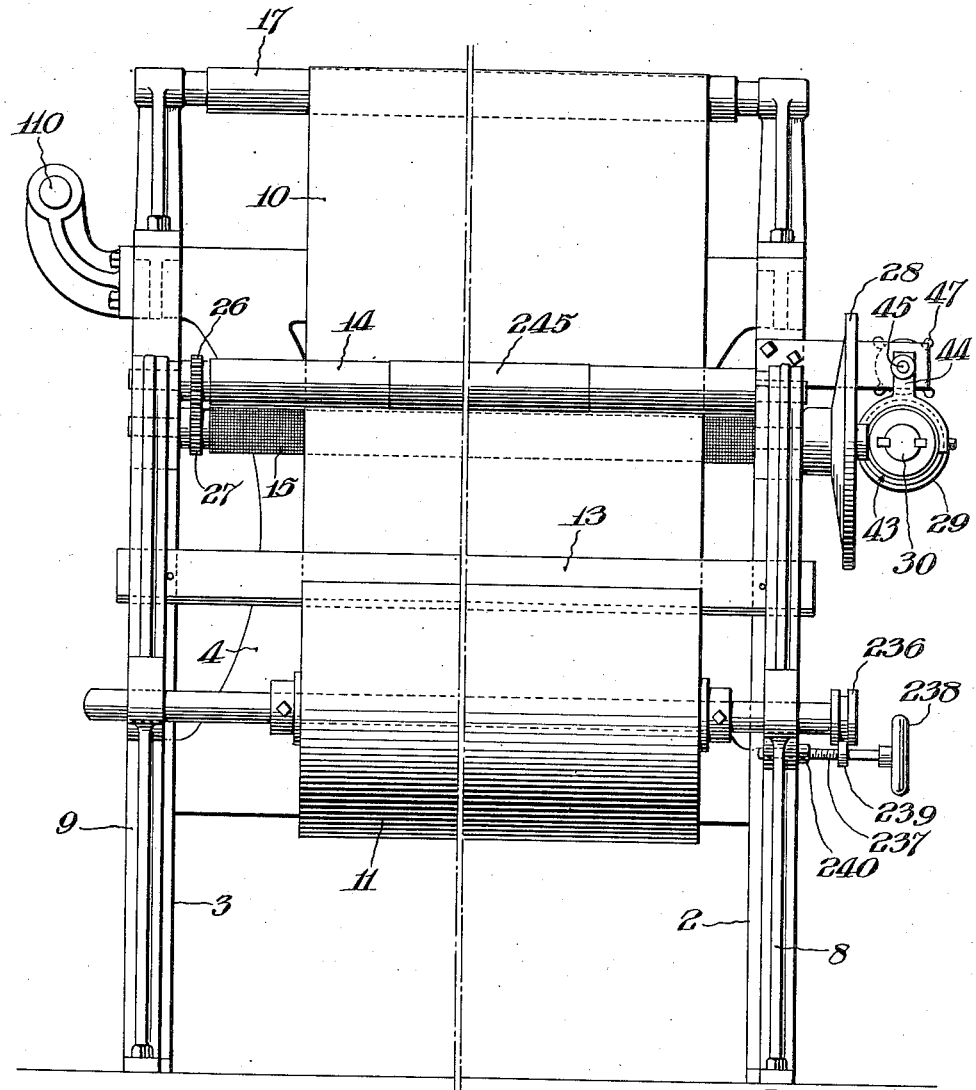

Dec. 16, 1930.  W. FLETT  1,785,546
MACHINE FOR MAKING LOOSE LEAVES FOR BOOKS
Filed Nov. 24, 1928  12 Sheets-Sheet 5
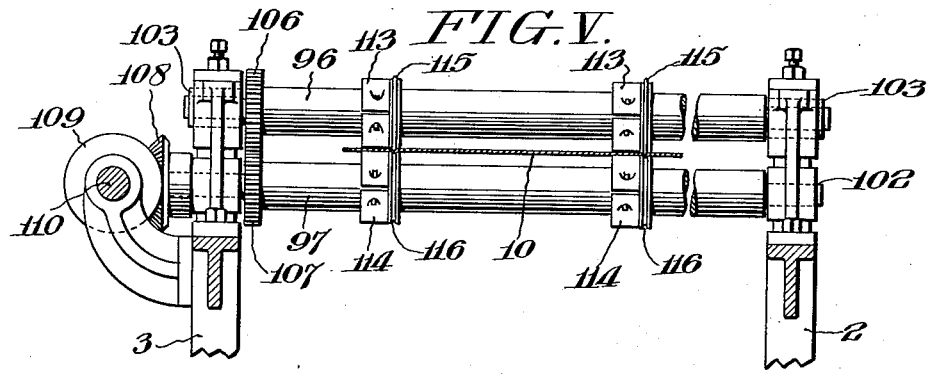
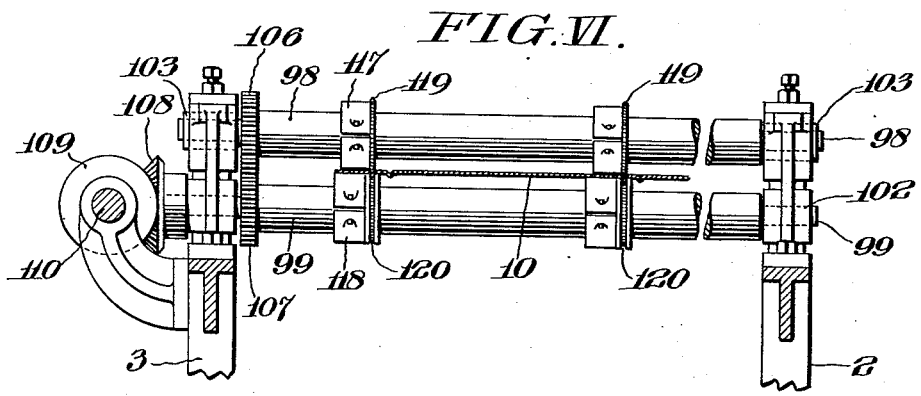
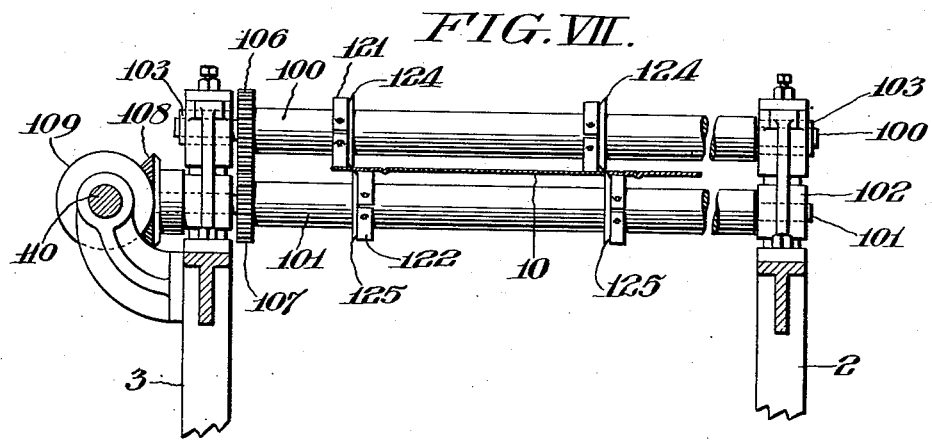
Inventor
William Flett,
By A. K. [signature]
Attorney.

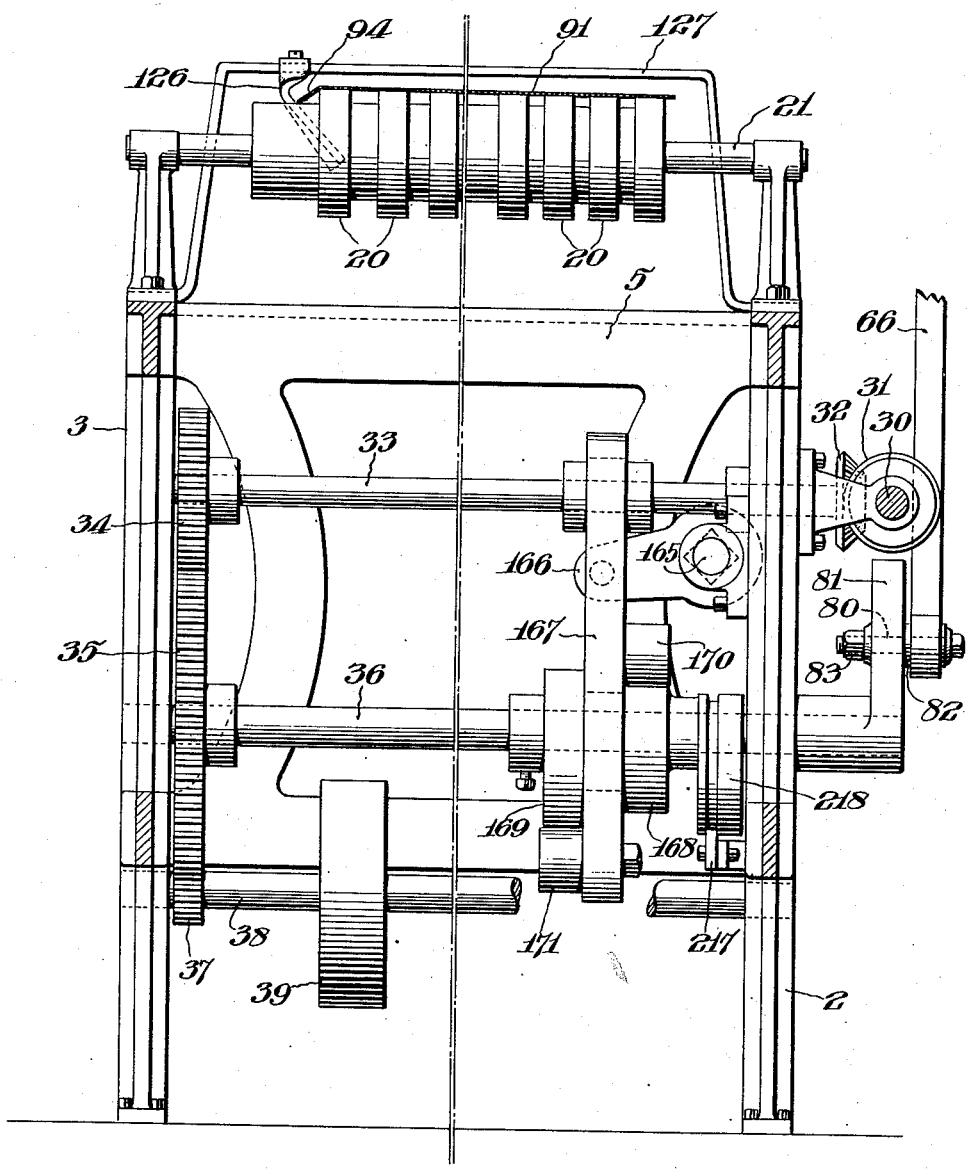

Dec. 16, 1930.  W. FLETT  1,785,546
MACHINE FOR MAKING LOOSE LEAVES FOR BOOKS
Filed Nov. 24, 1928   12 Sheets-Sheet 7
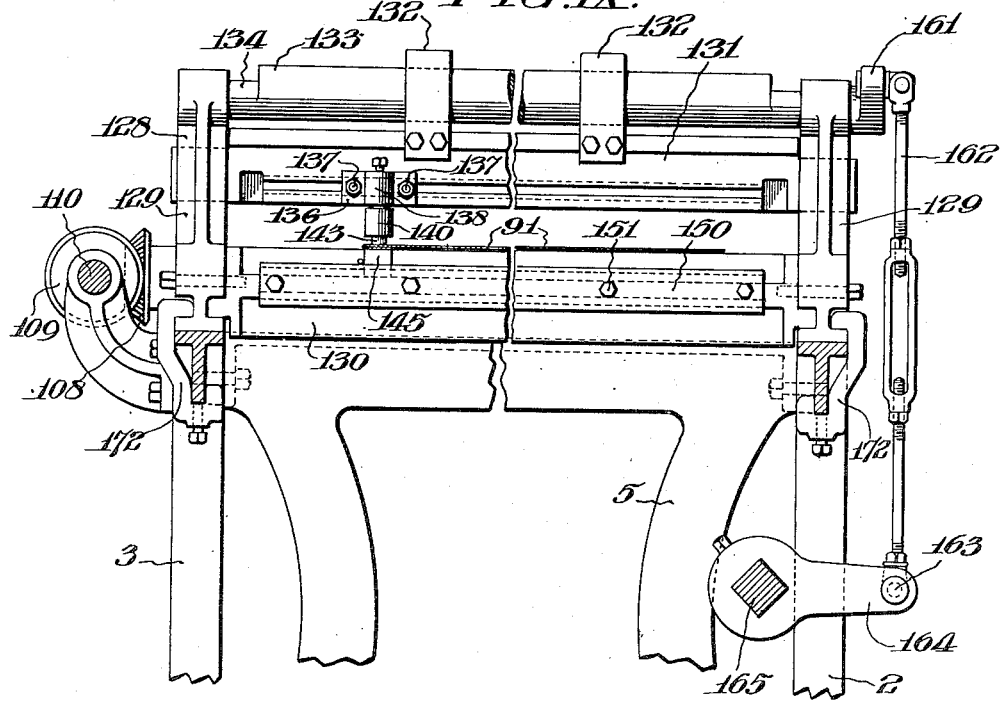
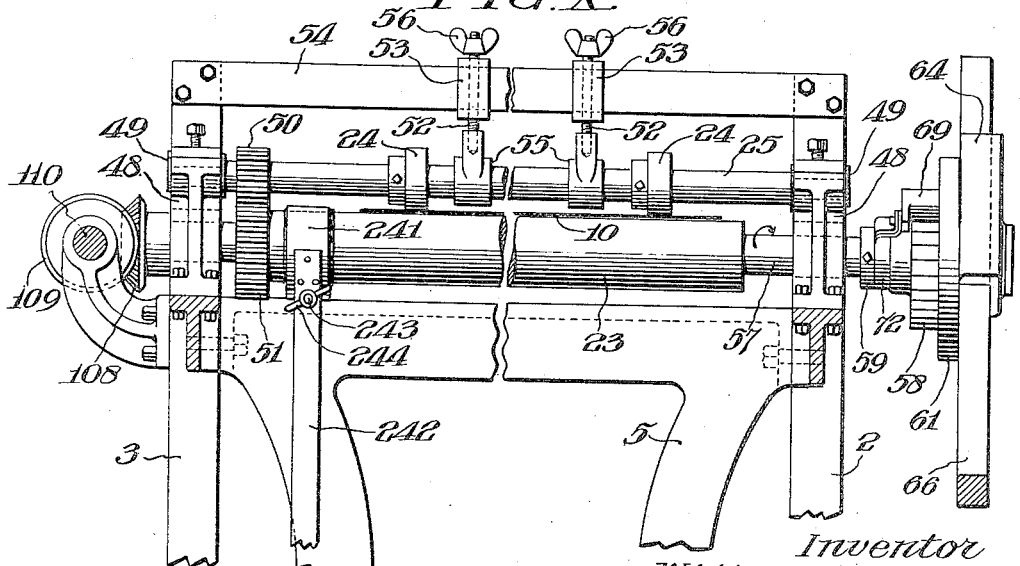
Inventor
William Flett,
By
Attorney.

Dec. 16, 1930.  W. FLETT  1,785,546
MACHINE FOR MAKING LOOSE LEAVES FOR BOOKS
Filed Nov. 24, 1928  12 Sheets-Sheet 8
FIG. XI.
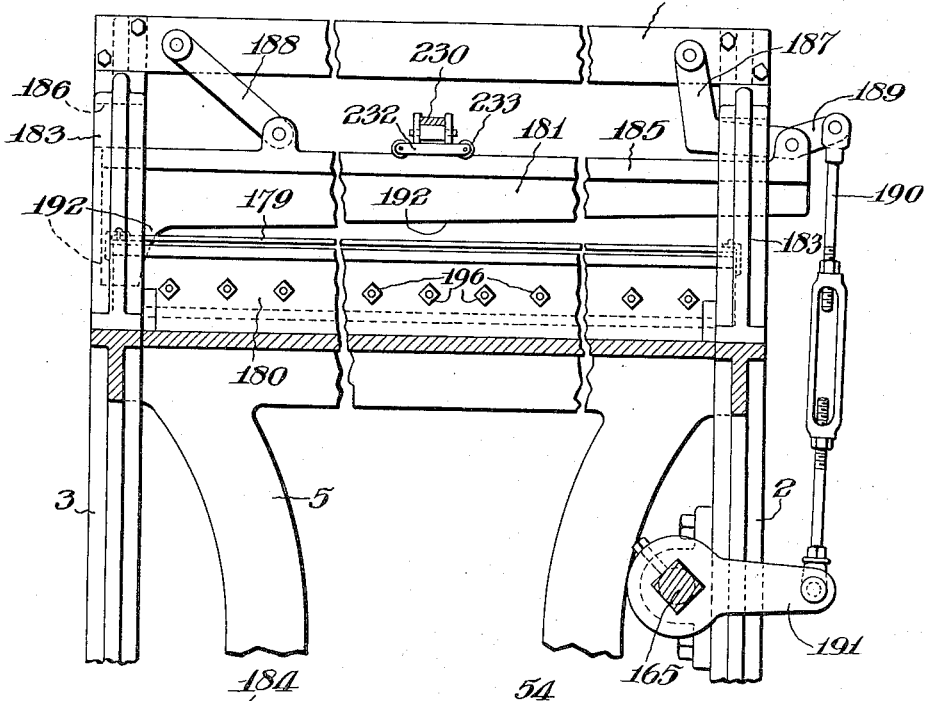
FIG. XII.
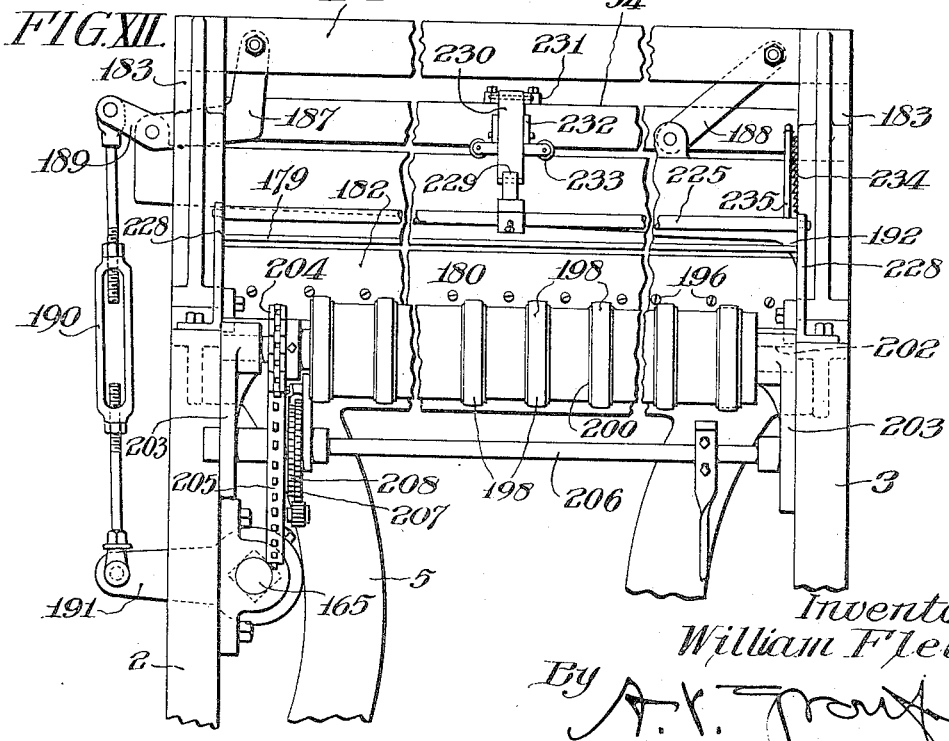
Inventor
William Flett,
By
Attorney.

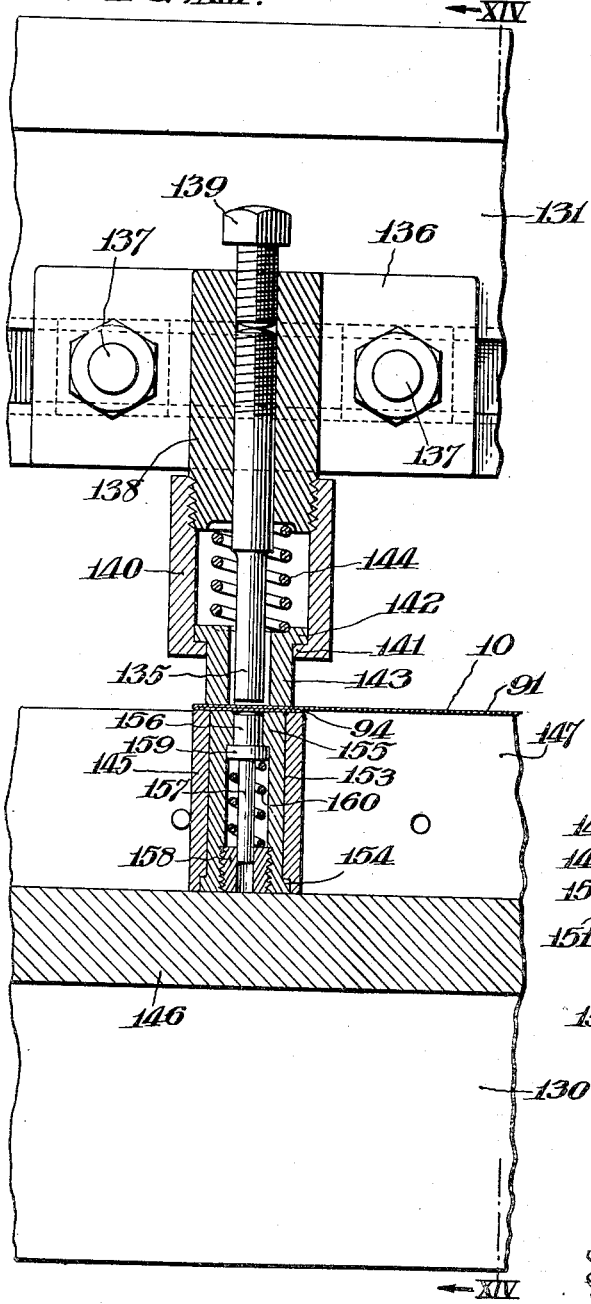
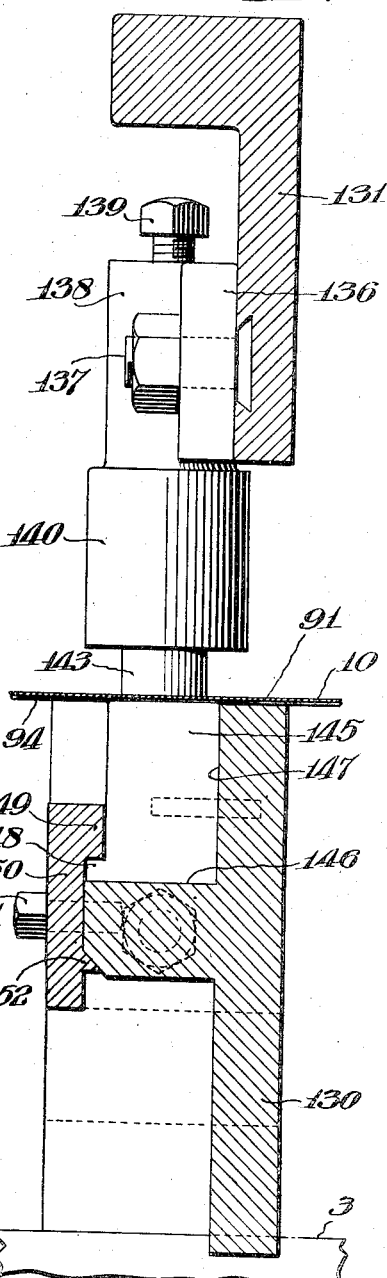

Dec. 16, 1930.                    W. FLETT                    1,785,546
                MACHINE FOR MAKING LOOSE LEAVES FOR BOOKS
                  Filed Nov. 24, 1928          12 Sheets-Sheet 10
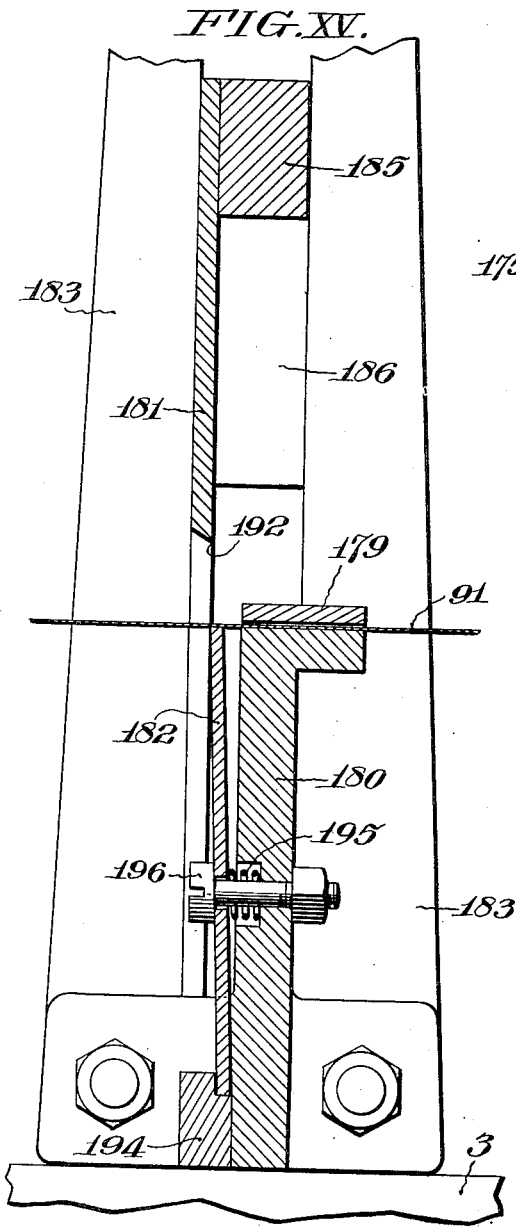
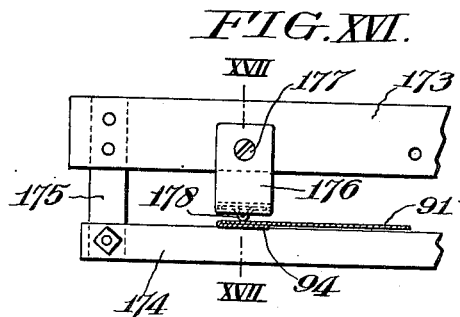
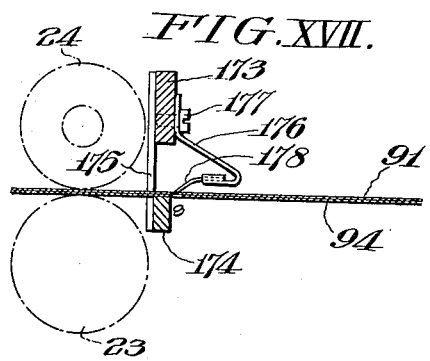
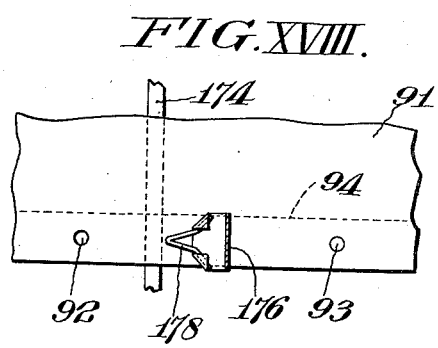
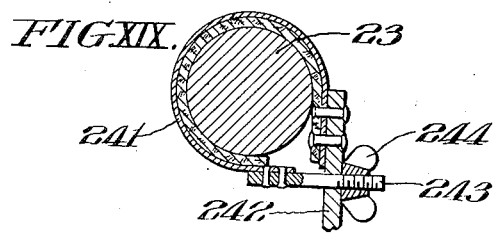
Inventor
William Flett,
By A. V. Frowty
Attorney.

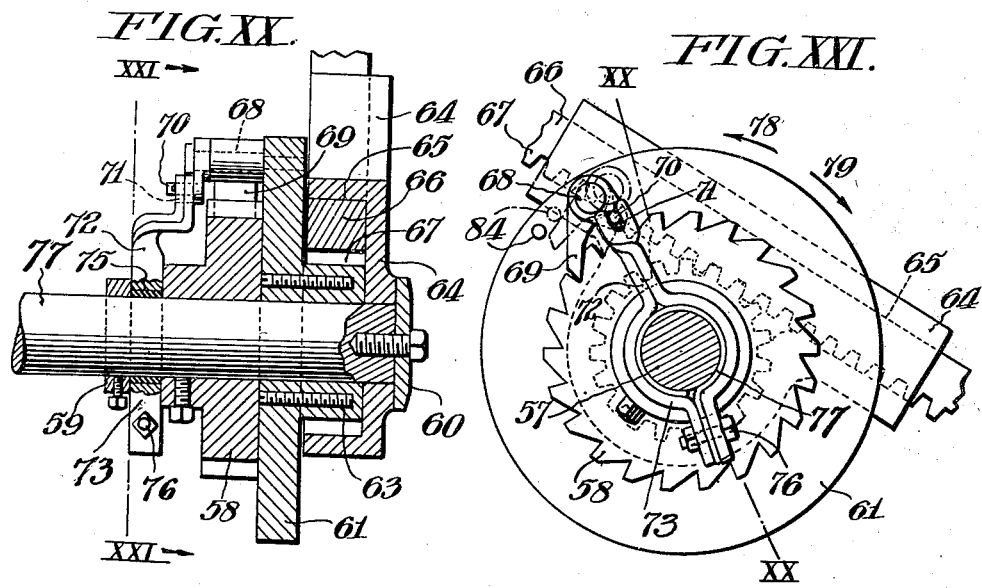

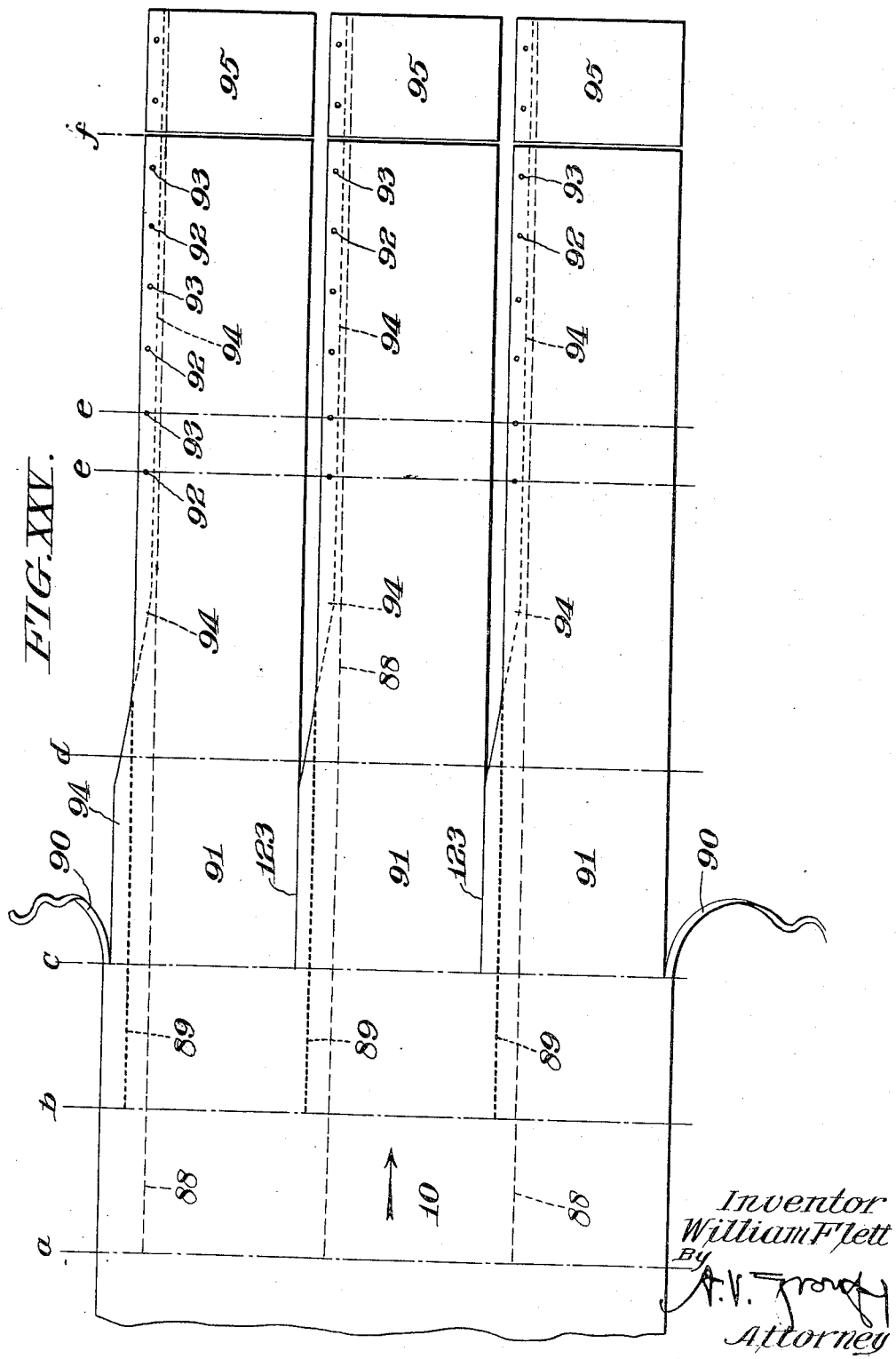

Patented Dec. 16, 1930

1,785,546

UNITED STATES PATENT OFFICE

WILLIAM FLETT, OF MELROSE, MASSACHUSETTS, ASSIGNOR TO NATIONAL PUBLISHING COMPANY, OF PHILADELPHIA, PENNSYLVANIA, A CORPORATION OF PENNSYLVANIA

MACHINE FOR MAKING LOOSE LEAVES FOR BOOKS

Application filed November 24, 1928. Serial No. 321,658.

This invention relates to improvements in machines for making loose leaves for books.

The object of the invention is to provide a novel, simple and efficient construction and organization of mechanism for drawing a sheet of paper from a roll or suitable source of supply, scoring the sheet longitudinally, cutting the sheet longitudinally into a plurality of strips, folding or doubling one longitudinal edge portion of each strip, perforating the doubled edge portion of each strip, cutting the strips transversely into loose leaves each having a doubled and perforated binding edge portion, and counting the loose leaves and delivering them in piles each containing a certain predetermined number of leaves.

With the foregoing and related objects in view the invention consists of the elements and combinations of them hereinafter described and claimed.

In the accompanying drawings, illustrating the invention,

Fig. I is a side elevation of a machine for making loose leaves for books, embodying my invention.

Fig. II is a plan of the machine.

Fig. III is a longitudinal vertical section through the machine on line III—III of Fig. II.

Fig. IV is an elevation of the machine, omitting certain parts thereof in the device, as seen from the upper feeding end thereof.

Fig. V is a transverse section through a portion of the machine on line V—V of Fig. II, showing some of the paper creasing devices.

Fig. VI is a transverse section through a portion of the machine on line VI—VI of Fig. II, showing some of the paper creasing devices.

Fig. VII is a transverse section through a portion of the machine on line VII—VII of Fig. II, showing the devices for cutting the strip of paper longitudinally.

Fig. VIII is a transverse section through the machine on line VIII—VIII of Fig. II.

Fig. IX is a transverse section through the upper portion of the machine on line IX—IX of Fig. II.

Fig. X is a transverse section through the upper portion of the machine on line X—X of Fig. II.

Fig. XI is a transverse section through the upper portion of the machine on line XI—XI of Fig. II.

Fig. XII is an end elevation of the delivery end of the machine, partly broken away.

Fig. XIII is a sectional detail showing one of the hole punching devices and adjuncts.

Fig. XIV is a vertical section through the parts shown in Fig. XIII.

Fig. XV is a vertical section showing the knives for cutting the strips of paper into leaves, and adjuncts.

Fig. XVI is a sectional detail showing one of the devices for ejecting paper discs from the holes punched in the paper.

Fig. XVII is a section through the parts shown in Fig. XVI on line XVII—XVII of Fig. XVI.

Fig. XVIII is a top view of certain parts shown in Fig. XVII, showing the bracket carrying the spring finger in section.

Fig. XIX is a sectional detail showing the friction device for retarding the movement of one of the paper feeding rollers.

Fig. XX is a sectional detail on line XX—XX of Fig. XXI, showing part of the mechanism of the intermittently actuated paper feeding rollers.

Fig. XXI is a sectional detail of the part shown in Fig. XX on line XXI—XXI of Fig. XX.

Fig. XXII is a sectional detail on line XXII—XXII of Fig. XXIII, showing the part of the mechanism for actuating the tapes which receive the cut leaves.

Fig. XXIII is a view of the parts shown in Fig. XXII as seen from the right hand side thereof, showing the central shaft in section.

Fig. XXIV is a sectional view of the parts shown in Fig. XXII on line XXIV—XXIV of Fig. XXII.

Fig. XXV is a plan of the paper strip which is acted upon by the machine, showing the end portion thereof which has passed through the mechanism of the machine and showing several leaves cut from the strip.

Referring to the drawings, the main frame of the machine comprises parallel, longitudinally extending side frames 2 and 3 connected by transverse bars 4 and 5; and supported upon the floor 7 which supports the side frames 2 and 3. Arranged slightly beyond the side frames 2 and 3 the forward or feed end of the machine are two supplementary side frames 8 and 9 which form, in effect, a part of the main frame of the machine.

The sheet of paper 10 to be acted upon by the machine is drawn from a roll of paper 11 carried by a shaft 12 which extends between and which is supported by the supplementary side frames 8 and 9. The end portions of the shaft 12 project beyond the ends of the roll 11 and are inserted into bearings in the frames 8 and 9 from above the same, the bearings being open at the top to permit the end portions of the shaft to be readily lowered into them when a fresh roll of paper is supplied to the machine.

The sheet of paper 10 from the roll 11 passes beneath a straightening bar 13 and upwardly therefrom to and between a pair of continuously operated feed rollers 14 and 15. From the feed rollers 14 and 15, the paper 10 passes down and around the bottom of a take-up roller 16, thence upwardly to and over a guiding roller 17, thence downwardly to and beneath two spaced guiding rollers 18 and 19, thence upwardly to and over laterally spaced forming rollers 20 on a shaft 21, thence downwardly to and beneath a guiding roller 22, and thence to and between a lower intermittently actuated feed roller 23 and upper laterally spaced feed rollers 24 carried by a shaft 25. The guiding rollers 17, 18, 19 and 22, the shaft 21 and the feed roller 23 are mounted to turn in suitable bearings secured upon the side frames 2 and 3.

The feed rollers 14 and 15 are provided with co-acting gears 26 and 27 to cause the upper roller 14 to be driven by the lower roller 15 and they are mounted to turn in bearings or brackets secured upon the side frames 2 and 3. The upper roller 14 has its trunnions extending into vertical slots in the bearings therefor so as to have vertical movement toward and from the lower roller 15 and the upper ends of the slots are open to permit the easy removal of the roller 14 from its brackets and its application thereto when a fresh sheet of paper is placed between the rollers. The lower roller 15 is serrated and the upper roller 14 rests upon the paper 10 passing between the rollers to press the paper against the lower roller 15 and cause the feeding of the paper when the lower roller is driven.

One trunnion of the lower feed roller 15 extends outwardly and is provided with a friction driving disc or wheel 28 the outer surface of which is engaged by a friction driving wheel 29 which is splined on a shaft 30 to be rotated thereby and to be longitudinally adjustable thereon. The shaft 30 extends longitudinally of the machine with its axis intersecting the axis of the feed roller 15 and its disc 28, and the shaft 30 is journaled in bearings which are secured to and project outwardly from the side frame 2. The rearward end portion of the shaft 30 is provided with a miter gear 31 in mesh with a similar gear 32 on one end portion of a shaft 33 which extends transversely of the machine and turns in suitable bearings on the side frames 2 and 3. The other end portion of the shaft 33 is provided with a pinion 34 which meshes with a gear wheel 35 on a shaft 36 extending transversely of the machine beneath the shaft 33 in parallel relation thereto. The shaft 36 is journaled in bearings on the side frames 2 and 3 and its gear wheel 35 is in mesh with a pinion 37 on the primary driving shaft 38 of the machine. This shaft 38 extends transversely between and turns in suitable bearings on the side frames 2 and 3, and it is provided with a driving pulley 39 which may be driven from any suitable source of power. As herein illustrated I have shown the pulley 39 as being driven by a belt 40 which passes around the same and a pulley on the power shaft of a suitable electric motor 41.

It will now be understood that when current is supplied to the motor 41, the shafts 30, 33, 36 and 38 will be driven thereby and that the friction wheel 29 will rotate the disc 28 and the feed rollers 14 and 15 in the direction of the arrows in Fig. I and thereby cause the rollers 14 and 15 to draw the paper 10 from the roll 11 and feed it into the machine continuously.

The hub 42 of the friction driving wheel 29 has an annular groove therein containing a collar 43 (Fig. IV) which is embraced by and connected to a bifurcated arm 44 which extends from one end portion of a relatively short screw threaded shaft 45 located above the shaft 30 in parallel relation thereto. This shaft 45 is screwed into and through a bearing 46 which projects outwardly from the side frame 2. The shaft 45 is fitted to turn in the arm 44 and the arm 44 is located between two collars fixed to one end portion of the shaft 45. The other end portion of the shaft 45 carries a hand wheel or head 47 by means of which the shaft 45 may be turned. By turning the hand wheel 47 the friction driving wheel 29 may be moved longitudinally on the shaft 30 either toward or from the axis of rotation of the lower feed roller 15 to decrease or increase the speed of rotation thereof and thereby decrease or increase the speed of the continuous feed of the paper 10 by the rollers 14 and 15.

The bearings 48 for the trunnions of the lower intermittently operated feed roller 23 have vertical guideways formed in the upper portions thereof for the reception of vertically movable bearing blocks 49 for the shaft 25 carrying the upper feed rollers 24; and the shaft 25 and roller 23 are provided with co-operating gears 50 and 51 (Fig. X) which cause the rollers 24 to be actuated when the roller 23 is actuated. The vertical guideways in the bearings 48 permit the bearing blocks 49 and shaft 25 and rollers 24 to be moved toward and from the lower feed roller 23. The shaft 25 and therewith the upper feed rollers 24 are constructed to be pressed toward the lower feed roller 23 to ensure the feeding of the paper 10 by the rollers by screws 52 which are screwed into and through blocks 53 carried by a bar 54 which extends between and is secured to arms rising from the bearings 48. The lower ends of the screws 52 are seated in sockets in bosses projecting upwardly from collars 55 on the shaft 25 and the upper ends of the screws are provided with wing heads 56 by means of which the screws may be turned by hand to regulate the pressure of the rollers 24 upon the paper 10.

The trunnion 57 on one end of the feed roller 23 extends outwardly and has a ratchet wheel 58 secured thereto; and oscillatable on the trunnion 57 between the ratchet wheel 58 and a disc 60 secured to the outer end of the trunnion 57 is a bearing member 64, a gear wheel 63 and a wheel or disc 61 secured to the gear wheel 63. The bearing member 64 is provided with a guideway 65 for the reception of the upper end portion of a bar 66 which is fitted to slide longitudinally therein. The end portion of the bar 66 which slides within the bearing member 64 is provided with gear teeth forming a rack 67 which is in mesh with the gear wheel 63. The lower end portion of the bar 66 is pivoted on a crank bolt 80 carried by a crank 81 secured to the outwardly projecting end of the power driven shaft 36 hereinbefore referred to, whereby, when the shaft 36 is rotated, the upper end portion of the bar 66 will be longitudinally reciprocated through the guideway in the bearing member 64, rocking the member 64 on the trunnion 57 and causing the gear rack 67 to impart a forward and back oscillatory movement to the gear wheel 63 and disc wheel 61 on the trunnion 57. The disc wheel 61 is provided with a projecting pin 68 on which a pawl 69 is pivoted and arranged to engage the ratchet wheel 58 and impart a forward movement to it and to the feed rollers 23 and 24, when the wheels 63 and 61 are moved forwardly, and to be disengaged from the ratchet wheel 58 when the wheels 63 and 61 are moved backwardly. It will thus be understood that, during the operation of the machine, the bar 66 operated by the crank 81 on the continuously revolving shaft 36, will impart an intermittent feeding movement to the feed rollers 23 and 24 in the direction of the arrows in Fig. III.

To move the pawl 69 into and from engagement with the ratchet wheel 58 during the forward and back movements of the wheels 63 and 61, and to hold the pawl 69 out of contact with the teeth of the ratchet wheel 58 during the entire backward movement of the wheels 63 and 61 I provide the following means: Projecting from the pawl 69 is a pin 70 which is located inwardly of the pin 68 toward the trunnion 57 and which extends into a slot 71 formed in the free end portion of an arm 72 projecting from a collar 73 on the trunnion 57 between a collar 59 thereon and the ratchet wheel 58. The collar 73 is split, and provided with projecting arms which are connected by a bolt 76 by means of which the collar 73 may be contracted upon the trunnion 57. Connected to the collar 73 and extending therefrom around the trunnion 57 between it and the inner surface of the collar 73 is a strap 77 of leather or other suitable friction producing material. The bolt 76 is adjusted to contract the collar 73 and clamp this strap 77 between it and the hub 59 to produce sufficient friction to cause the collar 73 and arm 72 to be turned by and with the ratchet wheel 58 when it is turned in one direction, and to permit the wheel 58 to be turned relatively to the collar 73 when the collar 73 is held against movement and the wheel 58 is turned in the reverse direction.

The arrangement of the pins 68 and 70 relatively to each other and to the axis of the roller trunnions 57, and the friction between the strap 77 and the collar 73 and ratchet wheel hub 59 is such as to cause the following operation: During the initial forward movement of the disc wheel 61, as shown by the arrow 78 in Fig. XXI, the arm 72 prevents the pin 70 from moving with the wheel 61 until the pin 70 causes the pawl 69 to be rocked on the pin 68 from the inoperative position shown by dot-and-dash lines in Fig. XXI to the operative position, shown by full lines in Fig. XXI in which the further movement of the pawl 69 on the pin 68 is prevented by the engagement of the pawl with the teeth of the ratchet wheel 58, whereupon, during the remainder of the forward movement of the wheel 61, the pawl 69 turns the ratchet wheel 58 and therewith the collar 73 and roller trunnion 57 forwardly. During the initial backward movement of the disc wheel 61, as shown by the arrow 79 in Fig. XXI, the arm 72 prevents the pin 70 from moving with the wheel 61 until the pin 70 causes the pawl 69 to be rocked on the pin 68 from the operative position shown by full lines in Fig. XXI to the inoperative position shown by dot-and-dash lines in Fig. XXI in which the further movement of the pawl 69 on the pin 68 is stopped by the engagement of the pawl 69 with a pin 84 on the wheel 61, whereupon, during the remainder of the rearward movement of the wheel 61 the pawl 69 will drag the arm 72 and collar 73 backwardly around the hub 59, holding the pawl 69 in the dot-and-dash line position shown in Fig. XXI and in readiness to be returned to its operative position upon the next forward movement of the wheel 61, as previously explained.

The crank bolt 80 extends through a slot in the arm 81 and the bolt is adapted to be secured to the arm 81 in different positions of adjustment toward and from the shaft 36 by clamping the arm 81 between a fixed collar 82 and an adjustable nut 83 on the bolt. By adjusting the bolt 80 on the arm 81 to different positions toward and from the shaft 36 the extent of movement of the paper strips 91 at each intermittent movement thereof may be varied.

It will now be understood that during the operation of the machine the sheet of paper 10 will be drawn from the roll 11 by the feed rollers 14 and 15 and fed forwardly in the direction of the arrows in Figs. I and III by the rollers 14 and 15, and by the feed rollers 23 and 24 and that the rollers 14 and 15 will feed the paper continuously while the rollers 23 and 24 will feed the paper intermittently. During the intervals of time between the feeding operations of the rollers 23 and 24, the slack produced in the paper 10 is taken up between the feeding rollers 14, 15 and guiding roller 17 by the take-up roller 16 which is supported by and within the loop of paper formed between the rollers 14, 15 and the roller 17, and which is raised by the paper during each feeding operation of the rollers 23 and 24, and which is lowered by gravity while the rollers 23 and 24 are idle and the rollers 14, 15 continue to feed the paper, thus keeping the paper drawn taut and under the proper tension at all times. The ends of the take-up roller 16 are provided with trunnions which rest against inclined bars 85 on the side frames 2 and 3 and guide the roller 16 during its up and down movements.

The straightening bar 13 is provided to remove from the sheet of paper 10 its tendency to curl and in some measure to retain the curvature of the roll 11 from which it is drawn. This bar 13 rests upon the roll 11 and has its respective end portions extending into guiding slots or ways 86 in arms 87 formed on and projecting upwardly from the supplemental side frames 8 and 9. These slots 86 guide the bar 13 during its descent by gravity as the diameter of the roll 11 grows less as the paper is drawn therefrom. The paper 10 is drawn upwardly from the straightening bar 13 to the feed rollers 14, 15, thereby forming an obtuse angle in that portion of the paper which extends upwardly from the bar 13 and that portion of the paper on the top of the roll 11 which is moving toward the bar 13. The angle thus formed in the paper kinks or bends it reversely of the curved condition of the paper produced by the roll 11 and thereby straightens the paper so that the product of the machine will be straight and flat. The straightening effect of the bar 13 upon the paper 10 is dependent upon the obtuseness or acuteness of the angle produced in the paper by the bar 13; that is to say, the greater the tendency of the paper to curl or retain the curvature of the roll 11 the more acute must be the angle produced in the paper by the bar 13. Therefore, as the inner portions of the paper of the roll 11 tend to curl or retain the curvature produced therein by the roll to a greater extent than the outer portions of the paper, I set the arms 87 and the slots 86 therein in such relation to the roll 11 and feed rollers 14 and 15 that the angle produced in the paper by the bar 13 will grow more acute as the diameter of the roll 11 diminishes in size and the bar 13 moves down through the slots 86 following the top of the roll, resulting in straightening all parts of the paper of the roll to the desired extent.

In Fig. XXV I have shown a top view of the sheet of paper 10 from the region of the guiding rollers 17 and 18 to and beyond the intermittent feed rollers 23 and 24 the center of which is indicated by the line $a$. As the paper passes through the machine it is acted upon therein by devices hereinafter described, first, to produce longitudinal score lines 88 in the sheet at the line $a$; second, to produce longitudinal score lines 89 in the sheet at the line $b$; third, to trim waste strips 90 from the longitudinal edge portions of the sheet and to cut the sheet longitudinally into a plurality of strips 91 at the line $c$; fourth, to turn one longitudinal edge 94 of each strip 91 downwardly and inwardly beneath the main body of the strip on its score line 89 in the region of the line $d$; fifth, to punch spaced pairs of holes 92, 93 through the main body and the downwardly and inwardly turned edge portion 94 of each strip 91 at the lines $e, e$; and, sixth, to cut the strips 91 transversely at the line $f$ and thereby produce the loose leaves 95, shown in Fig. XXV, which are the product of the machine and which are produced in numbers corresponding with the numbers of the strips 91 at each cutting operation on the line $f$.

As the sheet of paper 10 passes between the guide rollers 18 and 19 it passes first between upper and lower shafts 96 and 97, then between upper and lower shafts 98 and 99, and then between upper and lower shafts 100 and 101. The lower shafts 97, 99 and 101 turn in bearing brackets 102 on the side frames 2 and 3 and the upper shafts 96, 98 and 100 turn in bearing blocks 103 which are vertically adjustable in guides formed in the upper portions of the brackets 102. Each block 103 is provided with a downwardly projecting screw carrying a nut 104 which rests upon the bracket 102. By turning the nuts 104, the upper shafts may be raised and lowered into alinement and into proper positions relatively to the lower shafts. Each bracket 102 has a top plate secured thereon and provided with a set screw 105 constructed to be tightened against the underlying bearing block 103 to secure it in its adjusted position. The upper shafts 96, 98 and 100 are provided with gear wheels 106 which co-act with gear wheels 107 on the lower shafts 97, 99 and 101 to cause the upper shafts to be rotated by and with the lower shafts. The lower shafts 97, 99 and 101 project outwardly at one side of the machine and are provided with miter gears 108 in mesh with similar gears 109 on a shaft 110 which extends longitudinally of the machine and is fitted to turn in suitable bearings on the side frame 3 thereof. This shaft 110 carries a miter gear 111 meshing with a similar gear 112 secured on the outwardly projecting end of a trunnion on the lower intermittent feed roller 23, whereby, the shafts 96, 97, 98, 99, 100 and 101 will be intermittently turned in the directions of the arrows by and in harmony with the intermittent actuations of the feed rollers 23 and 24, previously described.

The shafts 96 and 97 carry split collars 113 and 114, respectively, which are provided with clamping bolts or screws and which are constructed to be secured to the shafts' different positions of longitudinal adjustment thereon to permit them to be set in different positions transversely of the direction of travel of the sheet of paper 10. The paper 10 passes between the collars 113 and 114 and there is a collar 113 and a collar 114 for each score line 88 produced in the paper. The collars 113 have smooth, peripheral, annular ribs 115 thereon which press the paper 10 into annular grooves 116 in the collars 114 for the formation of the score lines 88 in the paper.

The shafts 98 and 99 carry collars 117 and 118, respectively, which are constructed to be secured thereto in different positions of adjustment thereon similarly to the collars 113 and 114. The paper 10 passes between the collars 117 and 118 and there is a collar 117 and a collar 118 for each score line 89 produced in the paper 10. The collars 117 have relatively sharp, toothed or serrated, peripheral, annular ribs 119 which press the paper 10 into annular grooves 120 in the collars 118 for the formation of the score lines 89 in the paper.

The shafts 100 and 101 carry collars 121 and 122, respectively, which are constructed to be secured thereto in different positions of adjustment thereon similarly to the collars 113 and 114. There is a collar 121 and a collar 122 for each longitudinal cut 123 (Fig. XXV) in the sheet of paper 10, and the collars 121 and 122 carry co-acting beveled, lapping cutting discs 124 and 125, respectively, which produce the cuts 123 in the paper 10 and which cut the strips 90 from the edges thereof as the paper is drawn between the discs.

The shaft 21 is provided with forming rollers 20 one for each strip of paper 91 and the rollers 20 are set with relation to the strips 91 so that each score line 89, Fig. XXV, will have a peripheral edge portion of a roller 20 directly beneath it and the remainder of the roller extending back under the adjacent score line 88 and beneath the main body of the paper strip. Now, as the strips of paper 91 pass over the rollers 20, the tension on the paper between the forming rollers 20 and the guiding roller 22 causes the edge portions 94 of the strips 91 to bend downwardly on the score lines 89. As the paper strips 91 pass from the forming rollers 20 to the guiding roller 22 their turned down, lateral edge portions 94 are folded inwardly beneath the body portions of the strips 91 by fixed folding fingers or arms 126 which extend beneath the edge portions of the strips. The folding fingers or arms 126 are supported by and extend from a bar 127 which extends transversely of the machine above the path of travel of the paper strips 91 and has its respective end portions secured to the side frames 2 and 3.

Arranged between the guiding roller 22 and the intermittent feed rollers 23 and 24 are two parallel frames 128 carrying the devices for punching the holes 92, 93 in the paper strips 91. As these frames and the hole punching devices associated with each are the same, a description of one will suffice for both. Each frame 128 comprises two end brackets 129 resting upon the side frames 2 and 3, and a bar 130 extending transversely of the machine between and secured to the lower portions of the end brackets 129. Extending between the end brackets 129 above and parallel to the bar 130 is a vertically movable bar 131 having its respective end portions fitted to slide in vertical slots or ways in the end brackets 129. The bar 131 is provided with upwardly extending yokes 132 which enclose a long cam or eccentric 133 formed on or secured to a shaft 134 having its end portions fitted to turn in bearings in the upper end portions of the brackets 129. The cam or eccentric 133 is adapted to engage the top of the bar 131 and lower it when the shaft 134 is rocked in one direction and to engage the yokes 132 and raise the bar 131 when the shaft 134 is rocked in the reverse direction.

The bar 131 carries a set of punches or dies 135 (Fig. XIII) corresponding in number with the paper strips 91. Each punch or die 135 is carried by a block 136 which is carried by a pair of bolts 137. Each bolt 137 has a flared head on one end thereof fitted to an undercut longitudinally extending groove in the bar 131, and each bolt 137 has a nut screwed on to the other end thereof to clamp the block to the bar 131 to set the block in different positions of adjustment transversely of the line of travel of the paper. Each block 136 has a boss 138 formed thereon into which the upper portion of the punch 135 is screwed to be supported thereby and to be vertically adjustable therein. A set screw 139 is screwed into the top of the boss 138 to form an adjustable stop for the punch 135 and to be tightened against the same to lock it in position. Screwed on to the lower end portion of the boss 138 is a sleeve 140 which forms in effect a part of the boss and extends downwardly therefrom. The sleeve 140 has an inwardly extending annular flange 141 on the lower end thereof adapted to be engaged by an outwardly extending annular flange 142 on the upper end of a vertically movable sleeve 143 which enters the lower end portion of the sleeve 140 and projects below the bottom thereof. The lower portion of the punch 135 is reduced in diameter and it extends through the sleeve 140 and into a central bore in the sleeve 143 to a point near the bottom thereof. A spring 144 encircles the punch 135 within the sleeve 140 between the bottom of the boss 138 and the top of the sleeve 143 and holds the flange 142 normally against the flange 141. The punch 135 is adapted to be depressed against the action of the spring 144 relatively to the sleeve 143 as and for a purpose hereinafter described.

The bar 130 carries a set of die blocks 145 corresponding in number with the punches 135 and located beneath the same. These blocks 145 rest upon a ledge 146 and against a vertical wall 147 formed by the bar 130, and the blocks 145 are adjustable along the ledge 146 transversely of the direction of movement of the paper strips 91. Each block 145 has an outwardly extending rib 148 on the lower portion thereof over which extends a rib 149 on the upper portion of a clamping bar 150 which is secured to the bar 130 by means of cap screws 151. The lower portion of the clamping bar 150 has a beveled rib 152 thereon adapted to engage an opposing beveled surface on the bar 130 to draw the bar 150 downwardly when the screws 151 are tightened and thereby draw the rib 149 down upon the rib 148 and hold the blocks 145 firmly in place upon the bar 130.

Each block 145 has a vertical bore extending therethrough to which is fitted a bushing 153 having an annular flange 154 on the lower end thereof countersunk into the block 145. The upper end portion 155 of the bushing is contracted and forms a female die in vertical alinement with the punch 135 above the same. The upper end portion 156 of a plunger 157 is fitted to slide vertically within the contracted portion 155 of the bushing 153. The lower end portion of the plunger 157 slides vertically in a collar or sleeve 158 which is screwed into the bushing 153 and forms in effect a part thereof. The plunger 157 has a collar 159 formed thereon and arranged to engage the bottom of the contracted portion 155 of the bushing 153 and limit the upward movement of the plunger 157. The collar 159 is held normally against the contracted portion 155 by a spring 160 which encircles the plunger 157 between the collars 158 and 159, and against which the plunger is adapted to be depressed, as will be presently described.

The paper strips 91 pass between the bars 130 and 13, and the folded edge portion 94 of each strip passes between a punch 135 and a die block 145 beneath the same, so that when the bar 131 of each frame 128 is lowered, the sleeves 143 will engage the paper and force it down upon the die sleeves 153 and against the action of the springs 144 and clamp the folded edge portions 94 and the bodies of the paper strips 91 together while the punches 135 are forced on down through the paper and into the die sleeves 153 and thereby punch the holes 92 and 93 in the paper. As the punches enter the die sleeves 153, the plungers 157 therein are forced down against the action of the springs 160, and, when the punches 135 are raised from within the sleeves 153, the plungers 157 eject the paper discs cut by the punches 135 and sleeves 153 from within the latter.

I shall now describe the mechanism for rocking the shafts 134 to lower and raise the punch carrying bars 131 for effecting the hole punching operations. The ends of the shafts 134 project outwardly at one side of the machine and they are provided with arms 161 having the upper ends of links 162 pivotally connected thereto. The lower ends of the links are pivoted to the projecting ends of pins 163 which are fitted to turn in the outer end portions of arms 164 projecting outwardly from a shaft 165 which extends longitudinally of the machine and which turns in bearings on the side frame 2. The pins 163 form universal joint connections between the links 162 and arms 164 to permit the adjustment of the frames 128 as will be presently described. The shaft 165 is provided with an inwardly projecting arm 166 (Figs. I, III and VIII) which is pivotally connected to a vertically movable block 167 which extends between and above and below the shafts 33 and 36, the block 167 having vertical slots therein through which the shafts extend. The block 167 slides vertically between two cams 168 and 169 secured on the driving shaft 36, and the block 167 is guided in its vertical movement by the cams 168 and 169 and by the walls of the slots in the block 167 engaging the shafts 33 and 36. The block 167 is provided with pins which project outwardly from opposite sides thereof and carry rollers 170 and 171 which are engaged by the top and bottom of the cams 168 and 196, respectively, to cause the cams to lower and raise the block 167 and thereby rock the shaft 165 which rocks the shaft 134 to lower and raise the punch carrying bars 131.

The end brackets 129 of the frames 128 carrying the devices for punching the holes 92, 93 in the paper strips 91 are adjustable on the top of the side frames 2 and 3 longitudinally thereof to vary the distance between the frames 128 and to adjust the frames relatively to the other mechanism of the machine; and the brackets 129 are adapted to be secured to the side frames 2 and 3 in different positions of adjustment thereon by clamps or yokes 172 which embrace the bottom portions of the upper bars of the side frames 2 and 3 and the top of foot flanges on the brackets 129. These clamps 172 are provided with set screws adapted to engage the side frames 2 and 3 and force the clamps 172 downwardly to clamp the brackets.

Extending transversely of the machine in advance of the intermittent feed rollers 23 and 24 is a bar 173 (Figs. II, III, XVI, XVII, and XVIII) the respective ends of which are secured to the brackets or bearings 48; and extending parallel to the bar 173 and beneath the path of travel of the paper strips 91 is a bar 174 having its end portions secured to arms 175 which extend downwardly from the bar 173. The bar 173 is provided with rearwardly extending brackets 176 which are secured thereto by means of screws 177 which may be screwed into different holes in the bar 173 to permit them to be adjusted to different positions transversely of the machine. The brackets 176 correspond in number with the paper strips 91 and they are provided with rearwardly and downwardly inclined spring wire fingers 178 which are shaped and positioned as shown in the drawings. The free ends of the fingers 178 press lightly upon the paper strips 91 in the path of travel of the perforations 92, 93 therein and the end portions of the fingers 178 are adapted to enter the perforations during the passage thereof beneath the fingers and eject from the perforations any paper discs which may lodge therein, as a result of the punching operations.

The upper intermittent feed rollers 24 are adjustable on the shaft 25 to different positions transversely of the machine and they correspond in number with the paper strips 91 and they are set in position on the shaft 25 to engage the single thickness of the strips 91 away from the downwardly and inwardly turned edge portions 94 thereof for the uniform pull upon the paper strip 10 during the intermittent feeding thereof.

The paper strips 91 are fed forwardly by the intermittent feed rollers 23 and 24 to and between upper and lower paper guiding bars 179 and 180 (Figs. III and XV) and to and between the upper and lower cutting knives 181 and 182 of a paper cutting device which I shall now describe. The guiding bars 179 and 180 extend between and they are secured to the lower portions of brackets 183 which rise fixedly from the side frames 2 and 3. The upper end portions of the brackets 183 are connected by a bar 184 which has its end portions secured thereto. The upper knife blade 181 is secured to and carried by a vertically movable bar 185 which extends transversely of the machine below the bar 184 and has its respective end portions fitted to slide in vertical slots or ways 186 in the brackets 183. The bars 184 and 185 are connected by parallel-motion links 187 and 188 which are pivoted to the bars 184 and 185 to guide the bar 185 and maintain it in parallel relation to the bar 184. The link 187 is provided with an outwardly projecting arm 189 which is connected by a link 190 to an arm 191 which extends outwardly from the rockable shaft 165 hereinbefore referred to, whereby, when the shaft 165 is rocked, the upper cutting blade 181 will be raised and lowered.

The lower or cutting edge 192 of the upper cutting blade 181 is inclined or set at an angle with relation to the upper or cutting edge of the lower cutting blade 182 which is horizontal, as shown in Fig. XII, so that when the blade 181 is lowered it will be swung by the links 187 and 188 to the left hand side of the machine, as shown in Fig. XI, to cut the paper strips 91 extending between the blades 181 and 182 by a shearing action. The end portion of the upper blade 181 at the lower end of its cutting edge is provided with a downwardly directed extension 192 which extends below the top of the lower blade 182 when the upper blade 181 is in its uppermost position and which is in contact with the forward surface of the adjacent end of the lower blade. The lower blade 182 is supported upon a bar 194 (Fig. XV) secured to the bar 180, and the blade 182 is pressed yieldingly toward the blade 181 by springs 195 interposed between the bar 180 and the blade 182. These springs 195 encircle bolts 196 which extend through the bar 180 and the blade 182 and limit the movement of the blade 182 toward the path of the blade 181. A series of these bolts 196 each having a spring 195 is provided throughout the length of the blade 182, and when the blade 181 is raised the springs press one end of the blade 182 against the upper blade extension 192 and the remaining portion of the blade 182 a slight distance into the path of the blade 181. It will now be understood that when the upper blade 181 is lowered it will gradually force the lower blade 182 back out of its path against the action of the spring 195, beginning at the blade extension 192 and continuing to the opposite side of the machine and thus ensure a close contact of the cutting edges of the blades at the cutting point during the entire cutting or shearing operation.

The cutting operation just described takes place at the line f indicated in Fig. XXV after each advancement of the paper strips 91 by the intermittent feed rollers 23 and 24, and, at each cutting operation, a set of leaves 95 corresponding in number with the paper strip 91 are cut therefrom. As the sets of leaves 95 are thus cut they fall from the cutting edges of the blades 181 and 182 upon the rearward end portions of a set of conveyer tapes 198 which pass around rollers 199 and 200 carried by shafts 201 and 202 which turn in bearings on the side frames 2 and 3 and on brackets 203 respectively, extending therefrom. The sets of leaves 95 fall upon one another and form piles or stacks thereof upon the tapes 198 each containing a predetermined number of leaves counted by mechanism of the machine presently described; and upon the completion of each set of piles of leaves, the tapes 198 are advanced in the direction of the arrows in Figs. II and III to advance the completed piles a sufficient distance to clear the space in front of the blades 181 and 182 for the reception of the next set of piles. As the piles of leaves are thus successively advanced by the tapes 198 the piles are removed from the tapes by hand.

I shall now describe the mechanism for counting the leaves 95 as they are cut from the strips 91 and for intermittently actuating the tapes 198 to advance the piles of counted leaves from the cutting blades.

The shafts 201 and 202 are provided with sprocket wheels connected by a sprocket chain 204 the lower portion of which passes over a sprocket wheel 205 which is loosely mounted on a shaft 206 extending between the frame brackets 203. Fixed to the sprocket wheel 205 adjacent to one side thereof is a ratchet wheel 207, and loosely mounted on the shaft 206 adjacent to the ratchet wheel 207 is a ratchet wheel 208 containing the same number of teeth as the ratchet wheel 207. The two ratchet wheels 207 and 208 are adapted to be engaged by two pawls 209$^a$ and 209$^b$, respectively, formed on a single arm 209 which is pivoted on an arm 210 mounted to be rocked on the shaft 206. The arm 210 is pivoted to one end of a bar 211 the other end of which is pivoted to one arm 212 of a lever 213 by means of a pivot bolt 214 extending through a slot 215 in the lever arm 212 and secured thereto. The lever 213 is fulcrumed at 216, on a bracket on the side frame 2, and the other arm 217 thereof is engaged by a cam or eccentric 218, Fig. VIII, on the power shaft 36 previously described. The lever arm 217 is held against the cam 218 by a spring 219 connecting the bar 211 and the machine frame whereby, when the shaft 36 is rotated, the lever 213 will be rocked on its fulcrum to effect the forward and back rocking action of the arm 210 upon the shaft 206 for actuating the pawl 209.

The pawl arm 209 is moved toward and from the ratchet wheels 207 and 208 to engage the pawls 209$^a$ and 209$^b$ with and disengage them from the ratchet wheels 207 and 208 in the same manner that the pawl 69 is moved toward and from the ratchet wheel 58 to engage and disengage the same, as hereinbefore described; and for this purpose I provide an arm 72$^a$ and pins 70$^a$ and 84$^a$ which operate in the same relation to the pawl arm 209, arm 210 and shaft 206 as the arm 72 and pins 70 and 84 operate with relation to the pawl 69, disc wheel 61 and trunnion 57, respectively.

The ratchet wheels 207 and 208 are each provided with fifty teeth and the space between every fifth tooth of the ratchet wheel 207 and the tooth next adjacent thereto is deepened from the normal line and any number of these deepened spaces may be occupied by blocks 221 to destroy the effect of the adjacent deep teeth 223 by bringing the deepened space adjacent thereto out to the normal line of the ratchet wheel. These blocks 221 are removably secured to the ratchet 207 by screws 222 and any number of the blocks 221 may be removed as desired for purposes presently appearing.

When the arm 210 is rocked forward and back by the cam 218 the pawl 209$^a$ will engage the ratchet wheel 207 and turn it on the shaft 206 at each active stroke of the arm 210, and the pawl 209$^b$ will be permitted to engage and turn the ratchet wheel 208 only at such active strokes thereof when the pawl 209$^a$ is in registry with one of the deep teeth 223 of the ratchet wheel 207 from which the adjacent block 221 has been removed, the absence of the block permitting the pawl 209$^b$ to move into active relation to the ratchet wheel 208. The throw of the pawl carrying arm 210 under the influence of the cam 218 is such that at each active stroke of the arm 210 the pawl 209$^a$ will move the ratchet wheel 207 a distance equal to the space between nine of its teeth; in other words, during successive strokes of the arm 210 the pawl 209$^a$ engages every ninth tooth of the ratchet wheel 207; so that if but one of the blocks 221 be removed from its adjacent tooth 223, as shown at 224 in Fig. XXIII, the ratchet wheel 208 will be moved by the pawl 209$^b$ only at each fiftieth active stroke of the arm 210, when the pawl 209$^a$ is brought into registry with the tooth 223 adjacent to the deep space 224 for the actuation of the ratchet, because nine will not divide evenly into fifty.

The timing of the operation of the cam 218 is such that it gives an active stroke to the pawl carrying arm 210 following each cutting operation of the blade 181, and, therefore, it will be understood that after fifty leaves 95 have been cut from each paper strip 91 and deposited in a pile upon the conveyor tapes 198, the tapes will be actuated to move the piles of leaves in the direction of the arrow in Fig. II by the ratchet wheel 208 turning the shaft 206 and causing the sprocket wheel 205 to actuate the chain 204 and turn the shafts 201 and 202 carrying the rollers 199 and 200 which carry the tapes 198.

By removing different blocks 221 from the ratchet wheel 207 the pawls 209$^a$ and 209$^b$ may be caused to change their operation upon the ratchet wheels 207 and 208 to actuate the tapes 198 at different times with relation to the cutting operations of the blades 181 and 182 so that the leaves 95 may be delivered in piles containing different number of leaves. For example if two opposite blocks 221 be removed from the ratchet wheel 207 the ratchet wheel 208 will be actuated at every twenty-fifth active stroke of the pawl carrying arm 210 and the leaves 95 will be delivered in piles of twenty-five leaves each; and if the entire set of blocks 221 be removed from the ratchet wheel 207 the ratchet wheel 208 will be actuated at every fifth active stroke of the arm 210 and the leaves 95 will be delivered in piles of five leaves each.

As the leaves 95 are cut from the paper strips 91 by the blades 181 and 182 they fall a slight distance from the cutting edge of the blade 181 either to the tapes 198 or to the partially completed piles of leaves 95 thereon; and, in order to place the successive leaves as nearly as possible directly and uniformly upon the preceding leaves of the several piles thereof I provide a shaft 225 with yieldable pairs of arms 226 having parts 227 connecting them and extending transversely of the machine and being adapted to engage the tops of the leaves 95 and press them downwardly during and after the successive cutting operations. Each pair of arms 226 and the part 227 connecting them are formed of a single piece of spring wire, as shown in Fig. II; and the respective end portions of the shaft 225 are mounted to be rocked in bearings 228 on the frame brackets 203. The shaft 225 is also provided with an arm 229 the top of the free end portion of which bears against the bottom of the free end portion of an arm 230. The other end portion of the arm 230 is pivoted to a bracket 231 on the fixed bar 54 previously referred to to permit vertical movement of the arm 230. The arm 230 extends from the bracket 231 between the bar 184 and the vertically movable bar 185 carrying the cutting blade 181, and the arm 230 extends through a groove or way and rests upon a roller therein in a carriage 232 provided with anti-friction wheels 233 which are adapted to roll upon the bar 185.

The carriage 232 rests upon the bar 185 and supports the weight of the arm 230, and, as the bar 185 and cutting blade 181 are lowered and raised and given a sidewise motion relative to the direction of feed of the paper, as previously described, the arm 230 is thereby correspondingly lowered and raised without having any sidewise motion imparted thereto as it slides within the groove in the carriage 232 and the rollers 233 permit the sidewise movement of the bar 185 relatively to the carriage. The free end portion of the arm 229 is pressed downwardly against the top of the free end portion of the arm 230 by a light spring 234 connecting an arm 235 on the shaft 225 and the machine frame. At each downward movement of the bar 185 and blade 181 to effect a cutting operation, the shaft 225 is rocked causing the depression of the arms 226 and connecting parts 227 which engage the upper surfaces of the leaves 95 being cut and depress them toward the tapes 198. The arms 229 and 230 are so proportioned and arranged relatively to each other and to the bar 185 that the speed of the downward movement of the parts 227 is greater than that of the blade 181, causing the parts 227 to press the leaves 95 thereunder upon the tapes 198 and upon the previously cut leaves thereon before and after the completion of each cutting operation, thus holding the leaves in place and causing them to be piled upon the tapes 198 substantially in vertical alinement.

The shaft 12 carrying the paper roll 11 is movable longitudinally in its bearings in the side frames 8 and 9, and one end thereof extends outwardly and has a peripherally grooved wheel 236 (Fig. IV) secured thereon. Beneath the wheel 236 and extending parallel to the shaft 12 is a threaded shaft 237 having a hand wheel 238 on the outer end thereof and having its inner end portion screwed into and through the adjacent side frame 8. The shaft 237 has a fixed collar 239 thereon which extends into the groove in the wheel 236. When the hand wheel 238 is turned the shaft 237 will be adjusted longitudinally with respect to the frame 8, and, at the same time, the collar 239 will engage the wheel 236 and correspondingly adjust the shaft 12 and paper roll 11 thereon. This adjustment is provided to permit the roll 11 and the sheet of paper 10 drawn therefrom to be adjusted laterally of the machine and into proper registry with the cutting, scoring and other devices of the machine which act upon the paper. The shaft 237 is provided with a lock nut 240 to be screwed against the frame 8, after the adjustment of the paper roll 11, to lock the shaft upon which the roll turns in position.

To hold the intermittent feed rollers 23 and 24 firmly and accurately in position during their intervals of rest during the operation of the machine I provide the roller 23 with a friction strap 241 of suitable material such as leather. This strap extends around one end portion of the roller 23 and has one of its end portions connected to the upper end of a bar 242 which is secured to and extends upwardly from the floor 7 upon which the machine rests. The other end portion of the strap 241 is provided with a screw 243 which extends through the bar 242 and has a nut 244 screwed thereon which may be tightened against the bar 242 to increase the pressure of the strap 241 upon the roller 23 and thereby regulate the pressure or friction of the strap.

The upper continuously operated feed roller 14 has the central portion 245 thereof increased in diameter from the remaining portions thereof so that only the portion 245 of the roller will bear against the paper strip 10; and the length of the portion 245 is less than the width of the paper strip 10 so that no pressure will be applied to the edge portions of the paper strip as it passes between the rollers 14 and 15. The purpose of this is to apply feeding pressure only to the central portion of the paper strip, because the edge portions thereof are slightly wrinkled as they come from the roll 11 and pressure upon the slightly wrinkled edge portions would interfere with the proper and accurate feeding of the paper strip.

During the operation of the machine the power shaft 36 is driven continuously, and the crank arm 81 thereon operates to actuate the intermittent feed rollers 23 and 24 during one half of each revolution of the shaft and to permit them to remain idle during the other half of each revolution of the shaft; and the crank arm 81 is so set with relation to the cams 168 and 169 on the shaft 36 that the cams raise and lower the arm 166 to rock the shaft 165 at each interval of time while the intermittent feed rollers 23 and 24 are at rest. Therefore it will be seen that the punches 135 and the cutting knife 181 will be operated each time that the rollers 23 and 24 remain at rest, following each paper feeding operation. The cam 218 is placed on the shaft 36 to effect operation of the tapes 198 during the feeding of the paper by the rollers 23 and 24, at the proper intervals of time to advance the piles of leaves 95 upon the tapes following the completion of the successive sets of piles.

It will now be understood that during the operation of the machine, the strip of paper 10 will be drawn continuously from the roll 11 by the action of the continuously rotating feed rollers 14 and 15, and that the same paper will be drawn from the feed rollers 14 and 15 and fed through the machine intermittently by the action of the intermittently rotated feed rollers 23 and 24. While the feed rollers 23 and 24 are at rest the roller 16 moves downwardly by gravity and maintains the paper extending between it and the rollers 14 and 15 and between it and the guiding roller 17 in a taut condition; and while the feed rollers 23 and 24 are in action the roller 16 is moved upwardly by the loop of paper within which it rests and it thus continues to maintain the paper in a taut condition at all times. The strip of paper 10 thus fed through the machine is scored by the ribs on the collars 113 and 117 to produce the score lines 88 and 89 therein as the paper passes the lines $a$ and $b$, respectively, (Fig. XV) and it is cut by the cutters 124 and 125 to produce the strips 91 as the paper passes the line $c$. The edges 94 of the paper strips 91 are turned downwardly and inwardly by the arms 126 and rollers 20 as the paper passes the region of the line $d$ and a pair of holes 92, 93 is punched in each paper strip 91 at the lines $e, e$ during the intervals of time that the strips remain at rest between successive feeding operations of the feed rollers 23 and 24. Each time the pairs of holes 92, 93 are punched in the paper strips 91 the knife 181 is operated to cut a row of parts 95 from the free ends of the strips 91 at the line $f$, the parts 95 thus cut from the strips 91 being in the form of loose leaves for use in a loose leaf book and constituting the product of the machine. As the leaves 95 are thus cut from the strips 91 the leaves fall upon the tapes 198 and upon one another and build up in piles thereon until each pile contains a predetermined number of leaves as governed by the pawl 209 and ratchet wheels 207 and 208 as previously explained; and, thereafter, the tapes 198 are actuated under the influence of the cam 218 to advance the piles of leaves away from the position where they were produced, and the advanced piles of leaves are then removed from the tapes 198 by hand.

The construction and arrangement of the parts of the machine are such that the machine may be adjusted to act upon strips of paper of different widths for the production of leaves of different standard sizes as follows:

By adjusting the cutters 124 and 125 on the shafts 100 and 101 and by removing cutters from the shafts or by adding similar cutters to the shafts, a strip of paper of any width within the capacity of the machine may be cut into any desired number of strips corresponding with the strips 91.

By adjusting the scoring collars 113, 114, 117 and 118 on the shafts 96, 97, 98 and 99, respectively, and by removing scoring collars from the shafts or by adding similar scoring collars to the shafts, the desired score lines, corresponding with the score lines 88 and 89 may be produced in different numbers of strips corresponding with the strips 91 being cut by the cutters.

By adjusting the folding arms 126 longitudinally on the bar 127 the arms 126 may be set in position to co-operate with different fixed rollers 20 for the folding of the edge portion of the strips of paper being cut by the cutters.

By adjusting the blocks 136 and 145 longitudinally on the bars 131 and 130, respectively, and by removing blocks from the bars or adding similar blocks and the parts carried thereby to the bars different numbers of punches may be provided and positioned to properly punch the desired holes in different paper strips, corresponding with the holes 92 and 93 in the strips 91; and by adjusting the frames 128, carrying the bars 130 and 131, longitudinally of the machine on the side frames 2 and 3 the punches may be set in different positions properly to act upon different strips of paper for the production of different sized leaves.

By adjusting the connecting pin 80 for the bar 66 toward or from the shaft 36 the stroke of the bar 66 and the action of the pawl 69 upon the ratchet wheel 58 may be varied to vary the extent of movement of the paper strips at each intermittent feeding operation thereof for the production of leaves of different sizes.

I claim as my invention:—

1. The combination of a supporting frame, supporting means for a roll of paper, mechanism for advancing a strip of paper from a roll supported by the supporting means, means for folding a longitudinal edge portion of the paper strip downwardly and inwardly and upwardly adjacent to the main body of the strip, mechanism for punching holes through the paper strip and the folded edge portion thereof, and mechanism for cutting the paper strip transversely into separate sections.

2. The combination of a supporting frame, supporting means for a roll of paper, mechanism for advancing a strip of paper from a roll supported by the supporting means, mechanism for cutting the paper strip longitudinally into a plurality of strips, means for folding a longitudinal edge portion of each of the plurality of strips inwardly toward and adjacent to the main body of the strip, mechanism for punching holes through each of the plurality of strips and the folded edge portion thereof, and mechanism for cutting the plurality of strips transversely into separate sections.

3. The combination of a supporting frame, supporting means for a roll of paper, mechanism for advancing a strip of paper continuously from a roll supported by the supporting means, mechanism for advancing the paper intermittently from the first named mechanism, means for folding the paper strip, and mechanism for cutting the stationary portion of the paper strip transversely during idle intervals between intermittent paper advancing operations.

4. The combination of a supporting frame, supporting means for a roll of paper, mechanism for advancing a strip of paper continuously from a roll supported by the supporting means, mechanism for advancing the paper intermittently from the first named mechanism, means for folding a longitudinal edge portion of the paper strip inwardly toward and adjacent to the main body of the strip, and mechanism for punching holes through the paper strip and the folded edge portion thereof during idle intervals between intermittent paper advancing operations.

5. The combination of a supporting frame, supporting means for a roll of paper, mechanism for advancing a strip of paper continuously from a roll supported by the supporting means, mechanism for advancing the paper intermittently from the first named mechanism, means for folding a longitudinal edge portion of the paper strip inwardly toward and adjacent to the main body of the strip, mechanism for punching holes through the paper strip and the folded edge portion thereof during idle intervals between intermittent paper advancing operations, and mechanism for cutting the paper strip transversely during idle intervals between intermittent paper advancing operations.

6. The combination of a supporting frame, supporting means for a roll of paper, mechanism for advancing a strip of paper continuously from a roll supported by the supporting means, mechanism for advancing the paper intermittently from the first named mechanism, mechanism for cutting the paper strip longitudinally into a plurality of strips, means for folding a longitudinal edge portion of each of the plurality of strips inwardly toward and adjacent to the main body of the strip, and mechanism for cutting the plurality of strips transversely into separate sections during idle intervals between intermittent paper advancing operations.

7. The combination of a supporting frame, supporting means for a roll of paper, mechanism for advancing a strip of paper continuously from a roll supported by the supporting means, mechanism for advancing the paper intermittently from the first named mechanism, mechanism for cutting the paper strip longitudinally into a plurality of strips, means for folding a longitudinal edge portion of each of the plurality of strips inwardly toward and adjacent to the main body of the strip, and mechanism for punching holes through each of the plurality of strips and the folded edge portion thereof during idle intervals between intermittent paper advancing operations.

8. The combination of a supporting frame, supporting means for a roll of paper, mechanism for advancing a strip of paper continuously from a roll supported by the supporting means, mechanism for advancing the paper intermittently from the first named mechanism, mechanism for cutting the paper strip longitudinally into a plurality of strips, means for folding a longitudinal edge portion of each of the plurality of strips inwardly toward and adjacent to the main body of the strip, mechanism for punching holes through each of the plurality of strips and the folded edge portion thereof during idle intervals between intermittent paper advancing operations, and mechanism for cutting the plurality of strips transversely into separate sections during idle intervals between intermittent paper advancing operations.

9. The combination of a supporting frame, supporting means for a roll of paper, supporting means for a roll of paper, mechanism for advancing a strip of paper continuously from a roll supported by the supporting means, mechanism for advancing the paper intermittently from the first named mechanism, means for taking up the slack produced in the paper strip between said mechanisms during idle intervals between intermittent paper advancing operations, means for folding said strip, and mechanism for cutting the paper strip during idle intervals between intermittent paper advancing operations.

10. The combination of a supporting frame, supporting means for a roll of paper, mechanism for advancing a strip of paper continuously from a roll supported by the supporting means, mechanism for advancing the paper intermittently from the first named mechanism, means for folding said strip, mechanism for cutting the paper strip transversely into separate sections during idle intervals between intermittent paper advancing operations, a normally idle conveyor for receiving and advancing the paper sections, and means for actuating the conveyor at certain predetermined intervals.

11. The combination of a supporting frame, supporting means for a roll of paper, mechanism for advancing a strip of paper continuously from a roll supported by the supporting means, mechanism for advancing the paper intermittently from the first named mechanism, means for taking up the slack produced in the paper strip between said mechanisms during idle intervals between intermittent paper advancing operations, means for folding said strip, mechanism for cutting the paper strip transversely into separate sections during idle intervals between intermittent paper advancing operations, a normally idle conveyor for receiving and advancing the paper sections, and means for actuating the conveyor at certain predetermined intervals.

12. The combination of a supporting frame, supporting means for a roll of paper, continuously operating feed rollers for advancing a strip of paper continuously from a roll supported by said supporting means, a guiding roller for supporting the paper strip, intermittently operating feed rollers for advancing the paper strip intermittently from the guiding roller, a vertically movable take-up roller for acting upon the paper strip between the continuously operating feed rollers and the guiding roller, means for folding said strip, and mechanism for cutting the paper strip during idle intervals between intermittent paper advancing operations.

13. The combination of a supporting frame, supporting means for a roll of paper, feed rollers for advancing a strip of paper continuously from a roll supported by said supporting means, a continuously operating driving shaft, means operated by the driving shaft for actuating said rollers continuously, feed rollers for advancing the paper strip intermittently from the first named feed rollers, a take-up device for acting upon the paper strip between the first and second name feed rollers, a pawl and ratchet mechanism actuated by the driving shaft for actuating the second named feed rollers intermittently, means for folding said strip, and mechanism for cutting the paper strip during idle intervals between intermittent paper advancing operations.

14. The combination of a supporting frame, supporting means for a roll of paper, feed rollers for advancing a strip of paper continuously from a roll supported by said supporting means, a continuously operating driving shaft, means operated by the driving shaft for actuating said rollers continuously, feed rollers for advancing the paper strip intermittently from the first named feed rollers, a take-up device for acting upon the paper strip between the first and second named feed rollers, a crank actuated by the driving shaft, and means operated by the crank for actuating the second named feed rollers intermittently, means for folding said strip, and mechanism for cutting the paper strip during idle intervals between intermittent paper advancing operations.

15. The combination of a supporting frame, supporting means for a roll of paper, feed rollers for advancing a strip of paper continuously from a roll supported by said supporting means, a continuously operating driving shaft, means operated by the driving shaft for actuating said rollers continuously, feed rollers for advancing the paper strip intermittently from the first named feed rollers, a take-up device for acting upon the paper strip between the first and second named feed rollers, a crank actuated by the driving shaft, a pawl and ratchet mechanism actuated by the crank for actuating the second named feed rollers intermittently, means for folding said strip, and mechanism for cutting the paper strip during idle intervals between intermittent paper advancing operations.

16. The combination of a supporting frame, supporting means for a roll of paper, feed rollers for advancing a strip of paper continuously from a roll supported by said supporting means, a continuously operating driving shaft, means operated by the driving shaft for actuating said rollers continuously, feed rollers for advancing the paper strip intermittently from the first named feed rollers, a take up device for acting upon the paper strip between the first and second named feed rollers, a crank actuated by the driving shaft, a gear rack actuated by the crank, a gear wheel oscillated by the gear rack, a pawl mechanism actuated by the gear wheel for actuating the second named rollers intermittently, means for folding said strip, and mechanism for cutting the paper strip during idle intervals between intermittent paper advancing operations.

17. The combination of a supporting frame, supporting means for a roll of paper, feed rollers for advancing a strip of paper continuously from a roll supported by said supporting means, a continuously operating driving shaft, means operated by the driving shaft for actuating said rollers continuously, feed rollers for advancing the paper strip intermittently from the first named feed rollers, a take-up device for acting upon the paper strip between the first and second named feed rollers, means operated by the driving shaft for actuating the second named rollers intermittently, a rockable shaft, means operated by the driving shaft for rocking the last named shaft during idle intervals between intermittent paper advancing operations, means for folding said strip, and means operated by the rockable shaft for cutting the paper strip.

18. The combination of a supporting frame, supporting means for a roll of paper, feed rollers for advancing a strip of paper continuously from a roll supported by said supporting means, a continuously operating driving shaft, means operated by the driving shaft for actuating said rollers continuously, feed rollers for advancing the paper strip intermittently from the first named feed rollers, a take-up device for acting upon the paper strip between the first and second named feed rollers, means operated by the driving shaft for actuating the second named rollers intermittently, a rockable shaft, means operated by the driving shaft for rocking the last named shaft during idle intervals between intermittent paper advancing operations, means for folding said strip, a reciprocable cutter for acting upon the paper strip, guiding means for the cutter, and means operated by the rockable shaft for reciprocating the cutter.

19. The combination of a supporting frame, means for supporting and advancing a strip of paper longitudinally, rotatable scoring devices for scoring a longitudinal edge portion of the paper strip, means for rotating said devices, a folding roller for receiving and turning an edge portion of the paper strip downwardly on its score line, means for rotating the folding roller, and a fixed arm for folding said edge portion inwardly and upwardly adjacent to the main body of the paper strip.

20. The combination of a supporting frame, means for supporting and intermittently advancing a strip of paper longitudinally, means for scoring a longitudinal edge portion of the paper strip, a folding roller for receiving and turning an edge portion of the paper strip downwardly on its score line, means for rotating the folding roller, a fixed arm folding said edge portion inwardly and upwardly adjacent to the main body of the paper strip, and mechanism for cutting the paper strip transversely during idle intervals between intermittent paper advancing operations.

21. The combination of a supporting frame, means for supporting and intermittently advancing a strip of paper longitudinally, means for scoring a longitudinal edge portion of the paper strip, a folding roller for receiving and turning an edge portion of the paper strip downwardly on its score line, means for rotating the folding roller, a fixed arm for folding said edge portion inwardly and upwardly adjacent to the main body of the paper, mechanism for punching holes through the paper strip and the folded edge portion thereof during idle intervals between intermittent paper advancing operations, and mechanism for cutting the paper strip transversely during idle intervals between intermittent paper advancing operations.

22. The combination of a supporting frame, mechanism for supporting and advancing a strip of paper, means for folding said strip, and mechanism for cutting the strip transversely into separate sections, with a counting device for the paper sections comprising an element actuated each time the cutting mechanism is actuated to cut a section from the strip, and a part actuated by said element only at regular intervals following each of a plurality of operations of said element.

23. The combination of a supporting frame, mechanism for supporting and advancing a strip of paper, means for folding said strip, and mechanism for cutting the strip transversely into separate sections, with a counting device for the paper sections comprising two independently movable ratchet wheels, and a pawl arm actuated each time the cutting mechanism is actuated to cut a section from the strip, said arm having means for actuating one of said ratchet wheels each time the arm is actuated, and said arm having means controlled by the last named ratchet wheel for actuating the other ratchet wheel only at regular intervals following each of a plurality of operations of said arm.

24. The combination of a supporting frame, mechanism for supporting and advancing a strip of paper intermittently, means for folding said strip, mechanism for cutting the strip transversely into separate sections during idle intervals between intermittent paper advancing operations, a receiver for the paper sections, a pressing device movable toward and from the receiver, and actuating means for the pressing device.

25. The combination of a supporting frame, mechanism for supporting and advancing a strip of paper intermittently, means for folding said strip, a cutting device for cutting the strip transversely into separate sections during idle intervals between intermittent paper advancing operations, actuating means for the cutting device, a receiver for the paper sections, a pressing device movable toward and from the receiver, and means actuated by the cutting device for actuating the pressing device.

26. The combination of a supporting frame, means for supporting and advancing a strip of paper longitudinally, means for folding said strip, mechanism for punching holes through the paper strip, and a yieldable finger supported in the path traversed by the holes in the strip for entering the same and ejecting waste paper from them.

In testimony whereof I affix my signature.

WILLIAM FLETT.